July 11, 1950  J. D. CRARY  2,514,939
PAPER FASTENER
Filed March 19, 1946  2 Sheets-Sheet 1

JAY D. CRARY
INVENTOR
BY
ATTORNEY

July 11, 1950 J. D. CRARY 2,514,939
PAPER FASTENER
Filed March 19, 1946 2 Sheets-Sheet 2
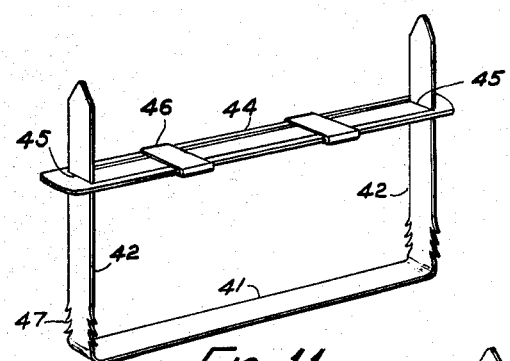
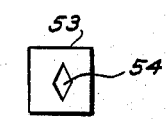
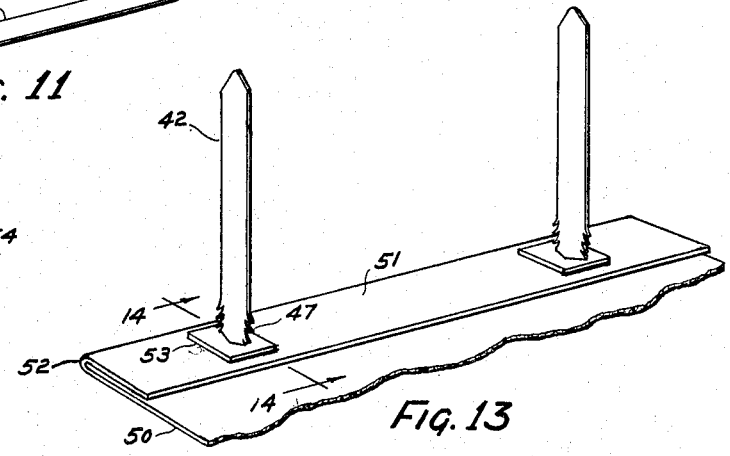
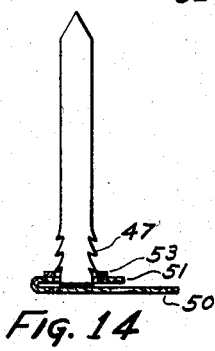
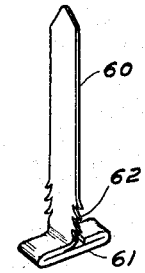
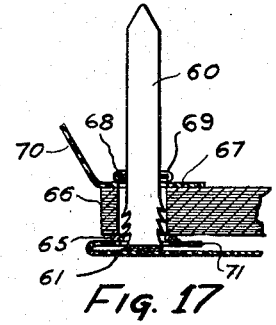
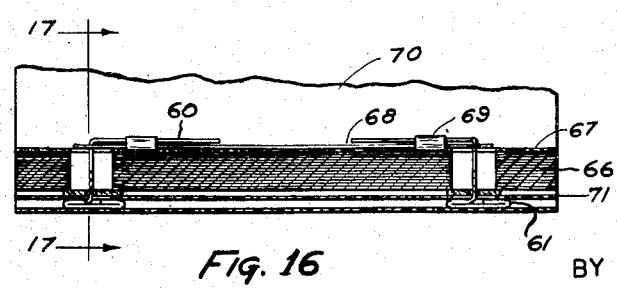
JAY D. CRARY
INVENTOR
BY E. A. Buckhorn
ATTORNEY Patented July 11, 1950

2,514,939

UNITED STATES PATENT OFFICE 2,514,939

PAPER FASTENER

Jay D. Crary, Portland, Oreg.

Application March 19, 1946, Serial No. 655,510

2 Claims. (Cl. 24—153)

The present invention relates to fastening devices. It is particularly concerned with improvements in fastening devices commonly known as paper fasteners or prong fasteners. Although the invention is applicable to a variety of such devices, it will be described primarily with reference to certain specific fastening devices now in common use and which are generally used to secure sheets of paper or the like together or to a backing member by means including one or more bendable prongs.

In the use of such fasteners, it frequently happens that while the prongs are straightened to an inoperative position for the purpose of adding or removing sheets, the fasteners become disengaged from the backing member or sheets and drop out so that the entire assembly operation must be repeated. While this annoying displacement of the fastener occurs most frequently when the sheets are mounted on the fastener by means of holes previously provided in the sheets for this purpose, it is also encountered in those cases where the assembly has been accomplished by puncturing the sheets with the pointed ends of the prongs.

The primary object of the present invention is to provide an improved fastener so constructed that it cannot readily be displaced or lost from a backing member or from the outermost of a plurality of sheets mounted thereon.

Another object of the invention is to provide an improved fastener having means integral with the prongs relatively to secure the fastener to a backing member threaded thereon.

A further object of the invention is to provide an improved fastener which is efficient in operation and economical in construction.

Additional objects of the invention will become apparent from the following description of the invention and with reference to the accompanying drawing in which:

Fig. 11 is a perspective view showing the present invention as applied to a fastener known as a binder prong fastener;

Fig. 12 is another modification of a washer for use with the various fastening devices;

Fig. 13 is a perspective view, partly broken away, showing the fastener of Fig. 11 as assembled with a binder cover;

Fig. 14 is a sectional view along line 14—14 of Fig. 13;

Fig. 15 is a perspective view of a single prong fastener;

Fig. 16 is a sectional view of a binder secured by means of the fastener of Fig. 15; and Fig. 17 is a sectional view along line 17—17 of Fig. 16.

Figure 1:
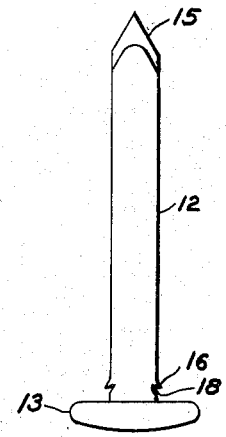
Fig. 1 is a front elevation of a fastening device constructed in accordance with the present invention.
Figure 2:
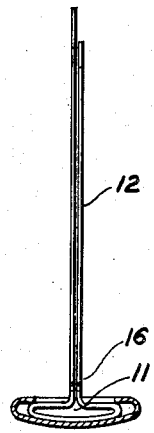
Fig. 2 is a side elevation partly in section of the fastener.

The fastener of the present invention comprises a head portion and one or more prong or leg portions with one or more projections provided on the prong portion adjacent the head of the fastener, the projection being designed to engage the sheet or sheets threaded onto the fastener between the projection and the head portion, or a suitable washer mounted above such sheets, thereby to prevent the accidental loss or removal of the fastener during the mounting of additional sheets or at any other time when the prong or prongs are straightened to an inoperative position for the purpose of adding or removing sheets.

In Figs. 1–4 of the drawing, where like reference numerals indicate the same parts, one type of fastener is shown as generally comprising a strip of metal bent to form a T-shaped head portion 11 and a pair of parallel prongs or legs 12. A cap 13 may be provided for enclosing or encasing the head portion 11. The prongs or legs 12 of this fastener are normally straight and contiguous when the sheets are being threaded thereon and are thereafter separated and pressed down into an operative position against the surface of the mounted sheets for the purpose of securing the sheets together. Frequently the ends of one or both of the prongs 12 are tapered or pointed as indicated at 15 to facilitate the piercing of the sheet material to be mounted thereon when a suitable hole for receiving the fastener has not previously been provided in the material.

In accordance with the present invention, one or more projections are provided on the prong portion adjacent the head of the fastener, which projections are preferably in the form of relatively small barbs 16 struck or gouged out of the prong portion with the ends thereof pointing outwardly or towards the head of the fastener. In the modification referred to, a barb is shown as protruding from each of the side edges of the prongs, all of the projections being substantially the same distance from the fastener head. These barbs can be formed by cutting or gouging into the edges of the prongs with a sharp tool directed away from the head and held at such an angle with respect to the side of the prong that the metal adjacent the cut is bent outwardly and away from the edge of the prong in the form of a generally triangular-shaped projection having a shoulder portion 18 facing the head 11.

Figure 3:
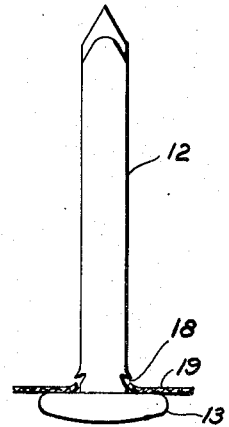
Fig. 3 is a view similar to Fig. 1 but showing the device applied to a backing member which has been pierced by the prongs to form a slot for receiving the fastener.

In the use of the fastener with a backing member such as pressboard or other relatively dense or thick fibrous sheet material, the fastener prongs may be forced through the material to form a slot for receiving the fastener. Ordinarily the resultant slot will only be as long as or only slightly longer than the width of the prongs, the exact size thereof depending on the ease with which the material gives under the force of the prongs. As the sheet material being mounted is moved along the prongs toward the head of the fastener, it readily slips over the barbs and against the head portion where, as shown in Fig. 3, the sheet 19 becomes operatively engaged by the shoulder portions 18. When so assembled the fastener will not become disengaged from the sheet 19 under normal handling conditions. Although these projections are relatively small, even in proportion to the width of the prongs, they have been found to fulfil effectively their intended purpose primarily because many fibrous materials, such as cardboard, pressboard, etc., are somewhat elastic or resilient in the sense that the fibrous material at the edge of the slot which has been forced outwardly from the slot as the sheet is pressed downwardly over the projections will spring back into the slot into operative engagement with one or more of the shoulders 18. This property of the fibrous sheet materials, also permits the removal and reinsertion of the fasteners a substantial number of times without damaging the slot to such an extent that the projections become ineffective for their intended purpose.

Figure 5:
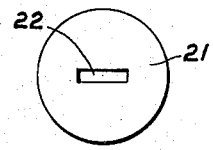
Fig. 5 is a plan view of the slotted washer of Fig. 4.
Figure 4:
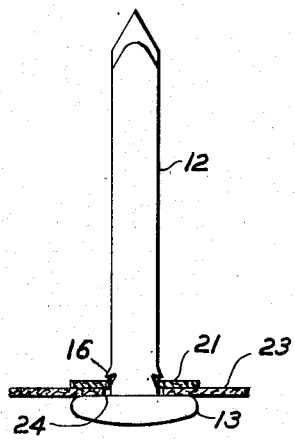
Fig. 4 is a view showing the device as secured to a previously punched sheet material by means of a slotted washer cooperatively mounted on the fastener.

Most of the fasteners of the type with which the present invention is concerned are normally used to fasten paper into folders, binders or similar backing members in which holes have been punched for receiving the fasteners. To adapt the barbed fastener to such applications, there has been provided in combination with the fastener, washers which can be threaded onto the fastener above the backing member and, by engagement with the projections, relatively secure the fastener thereto. One such securing means is shown in Figs. 4 and 5 in the form of a disc 21 which is preferably made of a heavy or dense fibrous or other suitable material and which has a slot 22 therein, the slot having substantially the same dimensions as the cross section of the prong portion between the barbs and the tips of the prongs. After a sheet 23 has been mounted on the fastener by inserting the fastener through a hole 24 provided therein for that purpose and has been moved against the head of the fastener, the disc is threaded onto the fastener and forced past the barbs 16 into engagement with the surface of the sheet as illustrated in Fig. 4, the ends of slot 22 then being operably engaged by shoulders 18 of the barbs in the same manner as are the edges of the pierced slot in the sheet 19 shown in Fig. 3.

It will be obvious of course that the washers need not necessarily be slotted prior to mounting thereof onto the fastener. The slot can be formed by piercing the fibrous disc with the fastener prongs during assembly in the same manner as hereinbefore described in connection with the mounting of sheet 19 onto the fastener as described in connection with Fig. 3.

Figure 7:
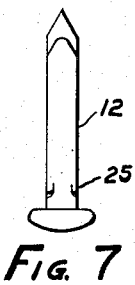
Figure 6:
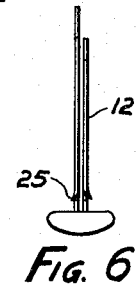
Fig. 6 is a side elevational view and Fig. 7 a front elevation view of a modified form of the fastener.

In Figs. 6 and 7 there is shown a modification of the invention in which the projections 25 of the fastener are struck sidewise from the edges of the prongs 12 and are adapted, for example, to engage the side edges of slot 22 provided in disc 21 when a washer of that type is employed in connection therewith.

Figure 8:
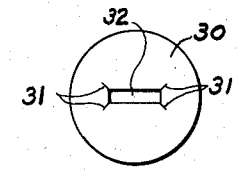
Fig. 8 is a modified form of washer for use with the fasteners of the present invention.

While washers of fibrous material are preferred both from the standpoint of cost and ease of manipulation, the invention is not restricted thereto. Fig. 8 discloses an alternative form of washer 30 for use in connection with either of the illustrated fasteners. In this instance, the washer may be of thin sheet metal or equivalent flexible and resilient material. To facilitate the sliding of washer 30 over the projections provided on the edges of the fastener prongs, a plurality of slits 31 are provided at the corners of the slot 32 so that, as the disc is pressed down over the projections on the fastener prongs, the tab portions of the disc between the adjacent slits 32 will ride over the surface of the projections 16 or 25 and thereafter snap back beneath and in operative engagement with the projections.

Figure 9:
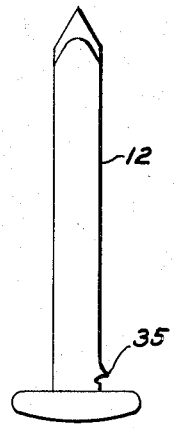
Figs. 9 and 10 are views, each illustrating additional modifications of the fastener of the present invention.
Figure 10:
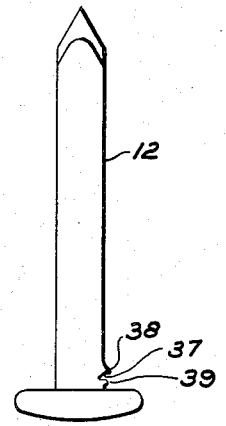

In Figs. 1–4, the projections have been shown as having a particular shape or form. However, while these fish hook shaped projections are preferred the invention is not restricted thereto. When displaced outwardly, the displaced metal may take the acceptable form of a somewhat rounded protuberance 35 such as that shown in Fig. 9 or in some cases, as is illustrated in Fig. 10, some metal may be displaced on both sides of the groove or notch 37 formed by the tool to form two projections 38 and 39 either or both of which will function in the desired manner particularly in combination with similar projections on the opposite side or edge of the prong portion. If desired more than one projection or barb can be provided on the edge of each prong, and in some instances, as will be pointed out hereinafter, a plurality of projections may be preferred.

In Fig. 11 there is shown another type of fastener comprising a head portion 41 in the form of an elongated member and having bendable prongs 42 integrally joined to the ends of the head portion. The fastener is normally used with a keeper adapted to be threaded onto the prongs over the sheet material mounted thereon, the keeper usually comprising an elongated substantially rectangular plate 44 having transversely extending openings 45 adjacent its ends. The openings 45 respectively receive the prongs 42 which are then bent inwardly and downwardly against the keeper plate and secured in the bent position by means of locking members 46 slidably mounted on the keeper plate. A series of projections 47 are provided on the edges of each of the prongs adjacent the head portion of the device.

Fasteners of the type shown in Fig. 11 are normally used either as file fasteners for clamping sheets of paper together or as binder fasteners in which case sheets of paper are fastened between two covers of pressboard or the like. By providing a series of closely spaced projections instead of a single projection on the side of each prong, the fasteners can be used with backing sheets of different thicknesses.

Figs. 13 and 14 illustrate one way in which this fastener can be secured to the back cover of a binder. In Fig. 13, numeral 50 indicates the back cover of the binder to which is fastened a binding flap 51 by means of a flexible hinge 52. As such binding flaps are usually purchased with perforations provided therein for receiving the fastener, a washer 53 is employed to secure the fastener to the binding flap, the washer being threaded onto the prongs 42 after the fastener prongs have been thrust through the perforated flap. The washer 53, which is particularly suited for this heavier-duty application, is shown in Fig. 12 as having a diamond-shaped prong receiving aperture 54 therein, the length of the opening being not greater, and preferably somewhat less, than the width of prongs 42 above projections 47 so that a close engagement of the corner edges of the aperture with the projections will be assured after the washer has been pressed downwardly into engagement with the binding flap 51. A washer need not be used, of course, when the apertures in the flap or other backing member are no larger than the width of prongs 42 since in such cases the projections 47 will directly and operatively engage the material of the backing member.

As a direct result of the present invention a less expensive fastening device can be employed with binders such as the one shown in Fig. 13. Such a device is shown in Fig. 15 as comprising a thin strip of metal bent to form a single prong 60 and a T-shaped head portion 61. A plurality of barbs 62 are provided on the prong adjacent the head portion. The procedure for using two of these fasteners with a binder cover is illustrated in Figs. 16 and 17 and comprises inserting the fasteners through apertures in the binding flap 71, threading a washer 65, which may be any of those described hereinbefore, onto each of the prongs and pressing the washers past some or all of the projections until flap 71 is brought into engagement with the heads of the fasteners. Sheets 66 are then threaded onto the prongs followed by binding flap 67 of the second or top cover 70. A keeper 68, which may be of the type shown in Fig. 11, is finally placed on the prongs, after which the protruding ends of the prongs are bent downwardly into engagement with the keeper and secured by means of the sliding locking members 69. By this arrangement, two such fasteners take the place of a fastener such as that shown in Fig. 11, with a resultant saving in the cost of the elongated head portion 41.

From the above description it will be seen that the present invention provides an improved fastening device which is simple and economical in construction and operation. When mounted in a backing member, the projections in cooperative engagement with the sheet material, or with the washer provided for that purpose, effectively secure the fastener against accidental displacement but do not prevent the intentional removal thereof if that should be necessary.

Although in the illustrated embodiments of the invention, small projections have been provided on both sides of the prongs, it is obvious that the intended results can be obtained with a fewer number of projections, all of which may be on only one prong or on only one side or face of the prong portion. It will be understood also that the projections need not take the specific shapes illustrated, provided they are so formed as to operatively engage the edge of the slots in the sheet material or washer mounted thereon sufficiently to prevent the accidental displacement of the fastening device.

Having described the invention in what are considered to be certain preferred embodiments thereof, it is desired that it be understood that the specific details shown and described herein are merely illustrative and that this invention may be carried out by other means.

What I claim is:

1. A fastening device of the class described comprising a head portion and a pair of normally parallel and contiguous flat prongs, the edge of at least one of said prongs adjacent the head portion having a barb facing said head portion, for retaining against said head portion a sheet of fibrous material pierced by and threaded onto said prongs.

2. A fastening device comprising a head portion, a pair of flat normally contiguous prongs, and barbs extending outwardly from each of the edges of said prongs adjacent the head portion, said barbs being pointed towards said head portion for removably holding a sheet of fibrous material pierced by and threaded onto said prongs in contact with said head portion.

JAY D. CRARY.

REFERENCES CITED

The following references are of record in the file of this patent:

UNITED STATES PATENTS

| Number | Name | Date |
|---|---|---|
| 119,604 | Hanna | Oct. 3, 1871 |
| 321,864 | Taylor | July 7, 1885 |
| 322,923 | Gingras | July 28, 1885 |
| 759,400 | Sibley | May 10, 1904 |
| 1,072,483 | Miller | Sept. 9, 1913 |
| 1,146,231 | Arant | July 13, 1915 |
| 1,425,384 | Kelly | Aug. 8, 1922 |
| 2,328,416 | Blizard et al. | Aug. 31, 1943 |

FOREIGN PATENTS

| Number | Country | Date |
|---|---|---|
| 198,694 | Switzerland | Dec. 1, 1938 |
| 199,989 | Switzerland | Dec. 1, 1938 |